United States Patent [19]

Blount

[11] 4,314,916

[45] Feb. 9, 1982

[54] PROCESS FOR THE PRODUCTION OF BROKEN DOWN LIGNIN-CELLULOSE SILICATE COPOLYMERS

[76] Inventor: David H. Blount, 5450 Lea St., San Diego, Calif. 92105

[21] Appl. No.: 257,950

[22] Filed: Apr. 27, 1981

Related U.S. Application Data

[60] Division of Ser. No. 203,730, Nov. 3, 1980, which is a continuation-in-part of Ser. No. 112,290, Jan. 15, 1980, which is a continuation-in-part of Ser. No. 29,202, Apr. 12, 1979, Pat. No. 4,222,757.

[51] Int. Cl.³ .......................... C08L 1/10; C08B 31/00
[52] U.S. Cl. ...................................... 260/13; 521/110; 521/112; 521/154; 525/356; 525/386; 528/25; 528/29; 528/44; 528/425

[58] Field of Search ...................... 260/13; 528/25, 29, 528/44, 425; 521/110, 112, 154; 525/356, 386

[56] References Cited

U.S. PATENT DOCUMENTS

| 4,220,757 | 9/1980 | Blount | 521/110 |
| 4,247,657 | 1/1981 | Blount | 521/154 |
| 4,281,110 | 7/1981 | Blount | 536/84 |

Primary Examiner—Morton Foelak

[57] ABSTRACT

Small particles of cellulose-containing plants and an oxidated silicon compound are mixed with an alkali metal hydroxide then heated to 150° to 220° C. while agitating thereby producing an alkali metal broken down lignin-cellulose silicate polymer which is then reacted with a polysubstituted organic compound to produce a broken down lignin-cellulose silicate copolymer.

12 Claims, No Drawings

PROCESS FOR THE PRODUCTION OF BROKEN DOWN LIGNIN-CELLULOSE SILICATE COPOLYMERS

CROSS-REFERENCE TO RELATED APPLICATIONS

This application is a divisional of U.S. patent application, Ser. No. 203,730 filed on Nov. 3, 1980, which is a continuation-in-part of my copending U.S. patent application, Ser. No. 112,290, filed Jan. 15, 1980, which is a continuation-in-part of my U.S. patent application, Ser. No. 029,202, filed Apr. 12, 1979, now U.S. Pat. No. 4,220,757.

BACKGROUND OF THE INVENTION

This invention relates to a process for the production of broken down lignin-cellulose silicate copolymers utilizing an alkali metal broken down lignin-cellulose silicate polymer and a polysubstituted organic compound in an aqueous solution which are reacted to produce a broken down cellulose copolymer which may be in the form of a precipitate or as an aqueous dispersion.

The products produced by this invention have many commercial uses and may be utilized as molding powder, as coating agents for wood and metal, as films, as fillers, as impregnating agents, as adhesives, as binders, as caulking material, as fibers, as sheets, as casting materials, as putty material and may be further reacted with organic compounds to produce useful resinous products and foams.

A broken down cellulose silicate copolymer is obtained by reacting the following components:

Component (a)
  broken down alkali metal lignin cellulose-silicate polymer;
Component (b)
  an organic compound having at least two carbon atoms, each of which is attached to a substituent which will split off during the reaction;
Component (c)
  optionally, a solvent;
Component (d)
  optionally, an emulsifying or dispersion agent;

Component (a)

Component (a), a broken down alkali metal lignin cellulose silicate product, is produced by the processes outlined in my U.S. patent application, Ser. No. 029,202, filed Apr. 12, 1979, and is incorporated into this invention.

Broken down, alkali metal lignin-cellulose polymers are produced by mixing 3 parts by weight of a cellulose-containing plant or plant derivative, 1 to 2 parts by weight of an oxidated silicon compound and 2 to 3 parts by weight of an alkali metal hydroxide, then heating the mixture at 150° C. to 220° C. while agitating for 5 to 60 minutes.

Any suitable plant or the products of plants which contain cellulose may be used in this invention. The plant material is preferred to be in the form of small dry particles such as sawdust. Suitable plants include, but are not limited to, trees, bushes, agricultural plants, weeds, vines, straw, flowers, kelp, algae and mixtures thereof. Wood is the preferred plant. Commercial and agricultural waste products may be used, such as stalks, paper, cotton clothes, bagasses, etc. Wood fibers (wood pulp) with lignin removed may be used in this invention. Plants that have been partially decomposed, such as humus, peat, certain soft brown coal, manure containing cellulose, etc., may also be used in this invention.

Any suitable alkali metal hydroxide may be used in this invention. Suitable alkali metal hydroxides include sodium hydroxide, potassium hydroxide and mixtures thereof. Sodium hydroxide is the preferred alkali metal hydroxide.

Any suitable oxidated silicon compound may be used in this invention. Suitable oxidated silicon compounds include silica, e.g., hydrated silica, hydrated silica containing Si—H bonds (silicoformic acid), silica sol, silicic acid, silica, etc., alkali metal silicates, e.g., sodium silicates, potassium silicate, lithium silicate, etc., natural silicates with free silicic acid groups and mixtures thereof.

The broken down alkali metal lignin-cellulose silicate polymer is dark brown to black in color, has at least one —COH radical removed from each cellulose molecule, the usual lignin-cellulose bond is not broken in most of the cases and the cellulose molecules are broken down into smaller molecules of alkali metal broken down cellulose silicate and carbohydrates which are water soluble. When a cellulose polymer such as cotton or wood with the lignin removed is reacted with an alkali metal hydroxide by the process of this invention a black water soluble broken down alkali metal lignin-cellulose silicate polymer is produced; this polymer may be reacted with a mineral acid until the pH is about 6 and a black, foamed broken down lignin-cellulose silicate resinous product and carbohydrates are produced. The foam is produced by the release of $CO_2$ which was removed from the cellulose polymer.

Compound (b)

Any suitable organic compound that will react with the broken down alkali metal lignin-cellulose silicate polymer may be used. An organic compound is preferred, having at least two carbon atoms, of which one is attached to a substituent, which are split off during the reaction. These organic compounds which are the reactants used in the preparation of broken down cellulose silicate copolymers have the graphical skeleton carbon structure of

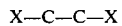

where

represents two adjacent carbon atoms, or

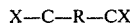

where X and X represent the substituents which splet off during the reaction. The R between the pair of reactive carbon atoms is selected from the following groups: saturated straight chain carbon atoms, unsaturated carbon atoms, ether linkages, aromatic structures, and others, for it is to be understood that other intervening structures may be employed. The X and X substituents can be halogen, acid sulfate, nitrate, acid phosphate, bicarbonate, formate, acetate, propionate, laurate, oleate, stearate, oxalate, acid malonate, acid tartrate, acid citrate and others. Examples of these organic compounds include, but are not limited to:

| | |
|---|---|
| CH₃CHXOCHX'CH₃ | AA' disubstituted ethyl ether; |
| XC₂H₄OC₂H₄X' | BB' disubstituted ethyl ether; |
| XCH₂OCH₂X' | Disubstituted methyl ether; |
| XC₂H₄OC₂H₄X' | Disubstituted ethoxy ethyl ether; |
| XCH₂CH₂SCH₂CH₂X' | Disubstituted thio ethyl ether; |
| XCH₂OCH₂C(CH₃)(CH₃)CH₂OCH₂X' | Disubstituted 1,3-methoxy 2,2, dimethyl propane; |
| XCH₂CH₂CH₂OCH₂OCH₂CH₂CH₂X' | Disubstituted dipropyl formal; |
| XCH₂CH₂O⟨⟩OCH₂CH₂X' | Disubstituted para-diethoxy benzene; |
| XCH₂OCH₂CH(X')OCH₃ | Disubstituted dimethoxy ethane; |
| XCH₂CH₂OCOCH₂CH₂X' (O) | Disubstituted diethyl carbonate; |
| XCH₂COCH₂CH₂OCCH₂X' (O)(O) | Disubstituted glycol diacetate; |
| X—⟨⟩CH₂OCH₂⟨⟩—X' | pp' Disubstituted dibenzyl ether. |
| X⟨⟩—O—⟨⟩—X' | pp Disubstituted diphenyl ether; |
| XCH₂CH₂SO₂CH:CH₂X' | Disubstituted diethyl sulphone; |
| CH₃CH₂CH(X)OCH(X)CH₂CH₃ | AA' Disubstituted propyl ether; |
| X⟨⟩X | Para Disubstituted benzene; |
| XCH₂⟨⟩CH₂X' | Disubstituted para xylene; |
| X⟨⟩CH₂CH₂⟨⟩X' | pp Disubstituted dibenzyl; |
| XCH₂CH₂CH₂⟨⟩CH₂CH₂CH₂C(X')CH₂CH₃ | Disubstituted para hexyl propyl benzene; |
| XCH₂CH=CH⟨⟩CH₂X' | Disubstituted 3 toyl propene 2; | and others such as methylene chloride or bromide, ethylene dichloride, ethylene dibromide, propylene dichloride or dibromide, halohydrins, epihalohydrins, dihalides of unsaturated hydrocarbon gases derived from pressure-cracking processes, natural gas-cracking processes as well as compounds having more than two substituents such as 1,1,2 trichloroethane; 1,2,4 trichlorobutane; 1,2,3,4 tetrachlorobutane; trichloromesitylene and the like. Mixtures of these compounds may be used in this process.

Component (c)

Any suitable inorganic or organic solvent may be used in this invention. Suitable solvents include but not limited to water, alcohols, such as methyl alcohol, ethyl alcohol, isopropyl alcohol, propyl alcohol, polyhydroxy organic compounds (polyols) such as ethylene glycol, propylene-1,2 and -1,3-glycol, butylene-1,4-and -2,3-glycol, hexane-1,6-diol, 2-methyl-propane-1,3-diol, glycerol, trimethylol propane, hexane-1,2,6-triol, butane-1,2,4-triol, trimethylol ethane, pentaerythritol, diethylene glycol, triethylene glycol, tetraethylene glycol, polyethylene glycol, dipropylene glycol, polypropylene glycol, dilintylene glycol, polybutylene glycols; polyesters, polyethers, sucrose polyethers and sucrose amine polyethers with at least 2, generally from 2 to 8 hydroxyl groups per molecule; and mixtures thereof.

Component (d)

Emulsifying or dispersing agents may be used in this invention, any salt-stable compound which is highly hydrophobous in nature and has a hydrophobic group as one component and a hydrophilic group as the other may be used. The emulsifying or dispersing agent which may be used for the formation of lattices of small-particle size are those compounds having such groups as SO₃, SO₄, NH₂, etc., as the hydrophilic component and a higher molecular weight alkyl, aralkyl, aryl or alkyl group as the hydrophobic component. The more hydrophobic the entire compound becomes, the smaller the polymer particle size becomes in the latex.

Compounds which are most suitable as emulsifying or dispersing agents for latex formation are the lignin sulfonates such as calcium and sodium lignin sulfonates, alkyl benzene sulfonates having more than 20 carbon atoms in the alkyl group, aryl alkyl sulfonates, sorbitan monolaurates, especially those which are oil soluble and slightly water soluble, and others. The dominance of the hydrophobic group over the hydrophilic groups is one of the important factors in producing a latex of small-particle size. The molecular weight of the hydrophobic group alone is not the deciding factor, for aryl groups, for example, may be more hydrophobic than an alkyl group of like molecular weight. Aryl alkyl groups are more hydrophobic than alkyl aryl groups of the same molecular weight. Thus by selection of emulsifying or dispersing agents, the particle size of the latex can be varied to suit any particular needs. Emulsifiers which can be used are sorbitan monolaurates, alkyl aryl sulfonates, alkyl aryl sulfates, aryl alkyl sulfonates, aryl alkyl sulfates, lignin sulfonates, methyl cellulose, sulfonated petroleum fractions, polymerized alkyl aryl sulfonates, polymerized aryl alkyl sulfonates, soybean lecithin, and the like. The particle size can be controlled by selecting emulsifying or dispersing agents having different molecular-weight hydrophobic groups as well as different hydrophobic groups. The particle size will also vary with the concentration of the emulsifying or dispersing agents.

In certain cases, other dispersing agents such as magnesium hydroxide or aqueous dispersions of peptized starch, gelatin, glue, blood-albumen, egg albumen, or the like, may be used.

The primary object of this invention is to produce broken down lignin-cellulose silicate copolymers. Another object is to produce broken down lignin-cellulose silicate copolymer that may be used as molding powder, as coating agents for wood and metal, as films, as filters, as impregnating agents, as adhesives, etc. Another object is to produce broken down lignin-cellulose silicate copolymers which will react with polyisocyanates to produce foam which may be utilized as thermal and sound insulation. Still another object is to produce polysulfide broken down lignin-cellulose silicate copolymers. Still another object is to produce polysulfide-silicate-broken down cellulose silicate copolymers. Still another object is to produce aldehyde-broken down lignin-cellulose silicate copolymers.

DETAILED DESCRIPTION OF THE INVENTION

The preferred process to produce a broken down lignin-cellulose copolymer is to slowly add a substituted organic compound having at least two carbon atoms, each of which is attached to a substituent which will split off during the reaction, to a broken down metal lignin-cellulose silicate polymer in the amount wherein the mols of the substituted radicals are about equal to the mols of the alkali radicals in the mixture, while agitating for about 30 minutes; at a temperature below the boiling temperature of the reactants; the reaction is complete in about 30 minutes to 8 hours thereby producing a broken down lignin-cellulose silicate copolymer. The salt produced may be removed by washing with water and then filtering.

In an alternate method the broken down alkali metal lignin-cellulose silicate copolymer is added to a solvent such as water, alcohols, polyhydroxy alcohols and mixtures thereof to produce a solution containing 10% to 70% broken down alkali metal lignin-cellulose silicate polymer, then a substituted organic compound having at least two carbon atoms, each of which is attached to a substituent which will split off during the reaction, is slowly added to said solution while agitating, at a temperature between ambient and just below the boiling temperature of the reactants for about 30 minutes; the reaction is complete in 30 minutes to 8 hours. When water is used as the solvent an emulsifying or dispersing agent may be used in the amount of 1% to 5% to assist in mixing the broken down alkali metal lignin-cellulose silicate polymer and the substituted organic compound. The broken down lignin-cellulose silicate copolymer may be recovered by filtration from an aqueous solution.

The chemical reaction of this invention may take place in any suitable physical condition. Ambient pressure is usually satisfactory, but in certain conditions, an elevated or below ambient pressure may be useful. In cases when halogenated organic compounds are used the reaction is speeded up by increased temperature (up to 200° C.) and pressure (up to 1,500 psi). When organic dihydrogen sulfate compounds are used it may be necessary to decrease the temperature by cooling the reactants. Ambient temperature is usually satisfactory. A suitable water soluble polysulfide such as an alkali metal polysulfide, alkaline earth metal polysulfide, ammonium polysulfide, polysulfides of ethanolamine and mixtures thereof, in an aqueous solution may be mixed with the broken down alkali metal lignin-cellulose silicate polymer in the ratio of 1 to 20 parts by weight of the water soluble polysulfide to 10 parts by weight of the broken down alkali metal lignin-cellulose polymer then a substituted organic compound, having at least two carbon atoms, each of which is attached to a substituent which will split off during the reaction, is slowly added while agitating between ambient temperature and the boiling temperature of the reactants for about 30 minutes. The reaction is complete in 30 minutes to 8 hours thereby producing a polysulfide-broken down lignin-cellulose silicate condensation product. The condensation product settles out and the water and salt are removed by decantation or by filteration.

The polysulfide-broken down lignin-cellulose silicate condensation product may be utilized as a molding resin and molded into useful objects by heat (110° to 180°) and pressure. It may be utilized as a caulking compound, as a curing agent for epoxy resins and may be reacted chemically with polyisocyanates and isocyanate-terminated polyurethane prepolymers to produce useful resinous products and foams; the foams may be used for thermal and sound insulation.

A suitable water soluble polysulfide silicate such as an alkali metal polysulfide silicate in an aqueous solution may be mixed with the broken down alkali metal lignin-cellulose silicate polymer in the ratio of 1 to 20 parts by weight of the water soluble polysulfide silicate to 10 parts by weight of the broken down alkali metal lignin-cellulose silicate polymer then a substituted organic compound, having at least two carbon atoms, each of which is attached to a substituent which will split off during the reaction, is slowly added while agitating between ambient temperature and the boiling temperature of the reactants for about 30 minutes. The reaction is complete in 30 minutes to 8 hours, thereby producing a polysulfide-broken down lignin-cellulose-silicate condensation product. The condensation product settles out and the water and salt are removed by decantation or by filteration.

The alkali metal polysulfide silicate compound may be produced by any of the methods as outlined in U.S. patent application Ser. No. 19,178 filed on Mar. 9, 1979, by David H. Blount, M.D. In the production of the alkali metal polysulfide silicate compound sulfur in any of its commonly known forms may be used; the sulfur may also be reacted with an alkali metal compound to produce alkali metal polysulfides. In the production of alkali metal polysulfide silicate compounds any suitable alkali metal hydroxide may be used; sodium hydroxide is the preferred alkali metal hydroxide. Any suitable oxidated silicon compound may be used such as silica, e.g. hydrated silica, silicon dioxide, silicoformic acid, polysilicoformic acid, silicic acid gel and silica sol, alkali metal silicates and natural silicates with free silicic acid radicals and mixtures thereof, may be used to produce alkali metal polysulfide silicate.

The alkali metal polysulfide silicate compound is produced by mixing 2 parts by weight of an alkali metal hydroxide, 1 to 4 parts by weight of a sulfur and 1 to 2 parts by weight of an oxidated silicon compound then heating the mixture to just above the melting temperature of sulfur while agitating for 10 to 30 minutes thereby producing an alkali metal polysulfide silicate compound.

The polysulfide-broken down lignin-cellulose silicate condensation produce may be utilized as a molding powder and molded into useful objects such as art objects, gaskets, knobs, handles, gears, etc., by heat (120° to 200°) and pressure. The condensation product may also be used with polyepoxy resins as a curing agent by heating the mixture to the softening temperature of the polysulfide-broken down lignin-cellulose-silicate condensation product. When about equal parts by weight of the broken down alkali cellulose polymer and water soluble polysulfide is utilized in the production of the polysulfide-broken down lignin-cellulose-silicate condensation product it may be utilized as a caulking agent and may also be cured by vulcanizing using heat, pressure and a metal oxide such as zinc oxide powder. The polysulfide-broken down cellulose-silicate condensation product in the form of a powder may be further reacted with a polyisocyanate or isocyanate-terminated polyurethane prepolymer to produce a polyurethane silicate foam; which may be utilized for thermal and sound insulation.

Any suitable aldehyde compound may be reacted with the broken down alkali metal lignin-cellulose silicate polymer before reacting the broken down alkali metal cellulose polymer with a substituted organic compound. Suitable aldehydes include but not limited to formaldehyde, acetaldehyde, propionic aldehyde, furfural, crotonaldehyde, acrolein, butyl aldehyde, paraformaldehyde pentanals, hexanals, petanals and mixtures thereof in the ratio of 1 to 5 parts by weight of the aldehyde to 2 parts by weight of the broken down alkali metal lignin-cellulose silicate polymer. The aldehyde is mixed with the water soluble broken down alkali metal lignin-cellulose silicate polymer then agitated at a temperature between ambient temperature and the boiling temperature of the aldehyde and at ambient pressure for 10 to 120 minutes thereby producing an aldehyde alkali metal lignin-cellulose silicate copolymer. The aldehyde-alkali metal-lignin-cellulose silicate copolymer is then mixed with a substituted organic compound having at least two carbon atoms, each which is attached to a substituent which will split off during the reaction, to said aldehyde-alkali metal-lignin-cellulose silicate copolymer in the amount wherein the mols of the substituted radicals are about equal to the mols of the alkali radicals in the mixture, then heated to a temperature between ambient temperature and the boiling temperature of the reactants while agitating at an ambient pressure to 1,500 psi for about 30 minutes; the reaction is complete in 30 minutes to 8 hours thereby producing a broken down cellulose copolymer. The copolymer gradually settles out and may be recovered by decantation or filtration.

The broken down lignin-cellulose silicate copolymer utilizing an aldehyde may be ground into a molding powder then molded into useful objects such as knobs, panels, art objects, handles, etc., by heat (180°–220° C.) and pressure. The broken down lignin-cellulose cellulose copolymer may be further reacted with polyisocyanates to produce useful solid objects or foams which may be used as thermal and sound insulation, for packaging, construction panels, etc. The broken down cellulose copolymer is also soluble in many of the common solvents and may be used as protective coating for wood and metal and as an adhesive.

The broken down lignin-cellulose silicate copolymers resinous products will react chemically with suitable polyisocyanates and/or polyisothiocyanates to produce resinous products and foams.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

$$O=C=N-R-N=C=O$$

wherein R is a divalent organic radical such as an alkylene, aralkylene or arylene radical. Such suitable radicals may contain, for example, 2 to 20 carbon atoms. Examples of such diisocyanates are:
 tolylene diisocyanate,
 p,p'-diphenylmethane diisocyanate,
 phenylene diisocyanate,
 m-xylylene diisocyanate,
 chlorophenylene diisocyanate,
 benzidene diisocyanate,
 naphthylene diisocyanate,
 decamethylene diisocyanate,
 hexamethylene diisocyanate,
 pentamethylene diisocyanate,
 tetramethylene diisocyanate,
 thiodipropyl diisocyanate,
 propylene diisocyanate,
 ethylene diisocyanate.

Other polyisocyanates, polyisothiocyanates and their derivatives may be equally employed. Fatty diisocyanates are also suitable and have the general formula:

$$\begin{array}{c} NCO \\ | \\ (CH_2)_z \\ | \\ CH_3(CH_2)_x CH(CH_2)_y NCO \end{array}$$

where $x+y$ totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethylene-isocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or bioret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substituted on the nucleus, with aldehydes or ketones may be used in this invention. Solutions of distillation residues accumulating during the production of tolylene diisocyanates, diphenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-, cyclohexylene 1,4-; and methylene-bis-(cyclohexyl-4,4') diisocyanate may be used in this invention. Suitable polyisocyanates which may be used according to the invention are described, e.g., by W. Siefkin in Justus Liebigs Annalen der Cherie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol, mannitol and sorbitol; methylglycoside, diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones, such as c-caprolactone, or hydroxycarboxylic acid such as w-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938, may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,3510 3,304,273; 3,523,093 and 3,110,695; and German Patent No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the cocomponent.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids of their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with ureaformaldehyde resins are suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 to 16 and pages 198 and 199; and in Kunststoff-Handbuck, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of the alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating is required to start the curing reaction.
6. Water containings 20% to 70% by weight of silica sol.
7. Activators (catalysts) which act as curing agents and are added to the polyurethane silicate prepolymer in the amount of 0.001% to 10% by weight. They may be added in water.
   (a) Tertiary amines, e.g., triethylamine; tributylamine; N-methylmorpholine; N-ethylmorpholine, N,N,N'N'-tetramethylenediamine; 1,4-diazobicyclo-(2,2,2)-octane; N-methyl-N'-dimethylaminoethyl piperazine; N,N-dimethylbenzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butaneediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyldiethanolamine; N-ethyldiethanolamine; and their reactive products with alkylene oxides, e.g., propylene oxide and/or ethylene oxide and mixtures thereof.
   (b) Organo-metallic compounds, preferably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds are described, e.g., in British Pat. No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention and details of their action are described in Kunstoff-Handbuch, Volume VII, published by Vieweg and Hochtlen, Carl-Hanser-Verlag, Munich, 1966, e.g., on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or gel, such as hydraulic cement, synthetic anhydrite, gypsum or burnt lime.
12. Mixtures of the above-named curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinioleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of 0% to 20%, but preferably 0.01% to 20%, by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering plasticizers, fungicidal and bacteriocidal substances and fillers, e.g., barium sulphate, kieselguhr, carbon black or whiting, amy also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, e.g., on pages 103 to 113. The halogenated paraffins and inorganic salts of phosphoric acid are the preferred fire-retarding agents.

The preferred curing agent is an aqueous solution of silicates, sodium silicate, and/or potassium silicate in water which is normally known as water glass. Aqueous solutions of silicates may be prepared in the form of 25% to 70% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are preferably produced with concentrated silicated solutions, which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)-phosphate; polyoxypropylene-chloromethylphosphonate; cresyldiphenylphosphate; tricresylphosphate; tris-(beta-chloroethyl)-phosphate; tris-(2,3-dichloropropyl)-phosphate; triphenylphosphate; ammonium phosphate; perchlorinated diphenyl phosphate; perchlorinated terephenyl phosphate; hexabromocyclodecane; tribromophenol; dibromopropyldiene; hexabromobenzen; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane products.

The ratios of the essential reactants and optional reactants which lead to the polyurethane silicate resinous or foamed product of this invention may vary, broadly speaking, with ranges as follows:
(a) 1 to 95 parts by weight of broken down lignin-cellulose silicate copolymer;
(b) 50 parts by weight of polyisocyanate, polyisocyanate or isocyanate-terminated polyurethane prepolymer;
(c) up to 20% by weight of a foam stabilizer;
(d) up to 50% by weight of a chemically inert blowing agent; boiling within the range of from −25° C. to 80° C.;
(e) up to 10% by weight of an activator;
(f) up to 200 parts by weight of a water-binding agent
(g) 1 to 95 parts by weight of a polyol.

Percentages are based on the weight of the reactants, resinous product polyol and polyisocyanate.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, it is preferred that the isocyanate-terminated prepolymer be sulphonated. It is usually sufficient to react the isocyanate-terminated polyurethane prepolymer with concentrated sulphuric acid or oleum of sulfur trioxide in order to produce a sulphonated poly urethane silicate) prepolymer containing the sulphonic group in the amount of 3–100 milli-equivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated poly(urethane silicate) prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar of hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0–200% by weight, based on the weight of the reactants. When a water-binding agent is added and when the curing agent is an aqueous alkali metal silicate solution, a halogen or phosphorus-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well knwon that a detailed description of cement will not be given here; however, one can find such a detailed description in Encyclopedia of Chemical Technology, Volume 4, Second Edition, Published by Kirk-Othmer, pages 684–710, of the type of cement which may be used in the production of this invention and are incorporated herein by reference.

Organic blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azisobutyric acid nitrile, may also act as blowing agents. Compressed air may act as a blowing agent. Other examples of blowing agents and details about the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the producy by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with copolymer or polyol or be reacted with the polyisocyanate to produce a polyurethane prepolymer. In that case, the function of the polyisocyanate is that of a nonvolatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane silicate plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished, or other working processes may be used to produce shaped products. The shaped products with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reacting the broken down lignin-cellulose silicate copolymer, polyol and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, from 1% to 200% by weight, based on the components. In certain cases, it is desireable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, alumino silicates, cements, basalt wool or powder, glass fibers, carbon fibers, graphite, carbon black, Al-, Fe-, Cri- and Ag-powders, molybdenum sulphide, steel wool, bronze or copper meshes, silicon powder, expanded clay particles, hollow glass beads, glass powder, lava and pumice particles, wood chips, woodmeal, cork, cotton straw, popcorn, coke or particles of filled or unfilled, foamed or unfoamed, stretched or unstretched organic polymers may be added to the mixture of the Components a, b and c in many applications. Among the numerous organic polymers which may be used, e.g., as powders, granules foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolamite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked-up in a kneader.

In many cases, the polyurethane silicate resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and converted into fibers and foils. These fibers and foils may be used for producing synthetic incombustible paper or fleeces.

When broken down lignin-cellulose silicate copolymer and polyisocyanate are combined with expanded clay and an alkali metal silicate solution, a very good concrete is obtained which can, for example, be used as panels in the construction field. In this case, the foam material (expanded clay) plays the part of the binding material.

DESCRIPTION OF PREFERRED EMBODIMENTS

My invention will be illustrated in greater detail by the specific example which follows, it being understood that these preferred embodiments are illustrative of, but not limited to, procedures which may be used in the production of broken down lignin-cellulose silicate copolymers. Parts and percentages are by weight unless otherwise indicated.

EXAMPLE 1

About 2 parts by weight of fir sawdust, 1 part by weight of hydrated silica and 1.5 parts by weight of sodium hydroxide flakes are mixed, then heated to 150° C. to 220° C. while agitating at ambient pressure for 5 to 60 minutes or until the mixture softens and expands into a brown, thick liquid which solidifies on cooling, thereby producing a broken down sodium lignin-cellulose silicate product.

Water is added to the broken down sodium lignin-cellulose silicate polymer to produce a 30% aqueous solution which is filtered to remove any unreacted cellulose then ethylene dichloride is slowly added to the solution, in amount wherein the sodium atoms about equal the chloride atoms, while vigorously agitating the mixture and heating the mixture to just below the boiling temperature of ethylene dichloride while vigorously agitating for about 30 minutes. The reaction is complete in 30 minutes to 8 hours thereby producing a light brown broken down lignin-cellulose silicate copolymer which settles out. The water, salt and unreacted components are removed filtration. The reaction time is decreased by utilizing elevated pressure and temperature.

EXAMPLE 2

About 2 parts by weight of small plant particles listed below, 1 part by weight of silica sol and 2 parts by weight of sodium hydroxide are mixed, then heated to 150° C. to 220° C. while agitating at ambient pressure, with care being taken to avoid burning the mixture, for 5 to 60 minutes; the mixture begins to expand and a brown, thick liquid, broken down sodium cellulose polymer. The liquid solidifies on cooling and is ground into a powder. The powder is soluble in water, alcohols, polyhydric organic compounds and other solvents.
 (a) oak sawdust
 (b) fir sawdust
 (c) cotton
 (d) corn cobs (e) cotton stalks
(f) ash sawdust
(g) seaweed
(h) bagasse
(i) paper
(j) oat straw Water is added to the broken down sodium lignin-cellulose silicate polymer produced from oak sawdust filtered to remove any unreacted sawdust, and a 50% aqueous solution of the broken down sodium lignin-cellulose silicate polymer is produced; then propylene dichloride is slowly added to the solution, in an amount wherein the chloride atoms are about equal to the sodium atoms, while vigorously agitating the mixture while heating to just below the boiling temperature of propylene dichloride for about 30 minutes. The reaction is complete in 30 minutes to 8 hours thereby producing a light brown lignin-cellulose silicate copolymer which precipitates out. The water, salt and unreacted components are removed by filtration.

EXAMPLE 3

Methylene chloride is slowly added to an aqueous solution containing 40% broken down sodium lignin-cellulose silicate as produced in Example 2e and 2% sodium lignin sulfonate while agitating and heating the solution to a temperature just below the boiling temperature of methylene chloride for 30 minutes. The reaction is complete in 30 minutes to 8 hours thereby producing a broken down lignin-cellulose silicate copolymer. The methylene chloride is added in an amount wherein the chloride atoms are about equal to the sodium atoms. Elevated pressure may be used.

EXAMPLE 4

The broken down alkali lignin-cellulose silicate polymer produced in Example 2f is mixed with ethyl oxolate in an about equal amount while agitating for about 30 minutes thereby producing a broken down lignin- ceullulose silicate polymer. The copolymer is recovered by filtration.

EXAMPLE 5

Propane -1,3-dihydrogen phosphate is slowly added to an aqueous solution containing 30% by weight of a broken down alkali metal lignin-cellulose silicate polymer as produced in Example 2h and 3% by weight of methyl ceullulose, in an amount wherein the phosphate radicals are about equivalent to the sodium radicals while agitating at a temperature just below the boiling temperature of the reactants for 30 minutes. The reaction is complete in 30 minutes to 8 hours thereby producing a broken down lignin-cellulose silicate copolymer.

EXAMPLE 6

About 3 parts by weight of a broken down alkali metal lignin-cellulose silicate as produced in Example 2f are ground into a fine powder then bis(2-chloroethyl)ether, in the amount wherein the chlorine atoms are about equal to the sodium atoms in the mixture, is slowly added while agitating at a temperature just below the boiling temperature of bis(2-chloroethyl) ether for about 30 minutes. The reaction is complete in 30 minutes to 8 hours thereby producing a broken down lignin-cellulose slicate copolymer.

EXAMPLE 7

An amount of para-dinitrobenzene, wherein the nitro and alkali metal radicals are about equal is slowly added to the broken down alkali metal lignin-cellulose silicate produced in 2b while agitating at a temperature just below the boiling temperature of paradinitrobenzene for about 30 minutes. The reaction is complete in 30 minutes to 8 hours thereby producing a broken down lignin-cellulose silicate copolymer.

EXAMPLE 8

About 10 parts by weight of broken down alkali metal lignin-cellulose silicate as produced in Example 2j are dissolved in ethanol then butan-1,4-di(hydrogen sulfate) is slowly added, in an amount wherein the hydrogen sulfate radicals are about equal to the sodium radicals while agitating for about 30 minutes. The reaction is complete in 30 minutes to 8 hours, thereby producing a brown broken down lignin-cellulose silicate copolymer.

Other disubstituted organic compounds may be used in place of butane-1, 4-di(hydrogen sulfate) such as para dichlorobenzene; 2,4-dinitrotoluene; chloroform; 1,3-dichloro-2-propanol; bis(2chloroethyl) formal; 1,3-dibromopropane; methylene chloride; 1,4-dibromo-2-butene; 1,3-chloromethoxy 2,2-di-methyl propane; dichloroethyl carbonate; 2,4-dinitrobenzene sulfonic acid; p p'-dichlorobenzyl and mixtures thereof.

EXAMPLE 9

About equal parts by weight of the broken down alkali metal lignin-cellulose silicate as produced in Example 2b and sodium polysulfide ($Na_2S_x$ wherein $x=4$ to 5) are added to water to produce an aqueous solution containing 40% solids then ethylene chloride, in an amount wherein the chloride atoms are about equal to the sodium atoms, are slowly added, while agitating for about 30 minutes while keeping the temperature just below the boiling point of the reactants. The reaction is complete in 30 minutes to 8 hours thereby producing a light brown-colored, somewhat elastic, poly(organic polysulfide broken down lignin-cellulose silicate) copolymer.

Other disubstituted organic compounds may be used in place of ethylene chloride such as para dichlorobenzene, 2,4-dinitrotoluene; tolylene diisocyanate; chloroform; 1,3-dichloro-2-propanol; bis(2 chloroethyl) formal; 1,3-dibromopropane; butane-1,4-di(hydrogen sulfate); dichloroethyl ether; methylene chloride; 1,4-dibromo-2-butene; 1,3-chloromethoxy 2,2-di-methyl propane; dichloroethyl carbonate; 2,4-dinitrobenzene sulfonic acid and p p'-dichlorobenzyl.

EXAMPLE 10

About 3 parts by weight of sulfur and 2 parts by weight of granular sodium silicate are mixed and then heated to just above the melting temperature of sulfur while agitating at ambient pressure for 10 to 30 minutes, thereby producing an alkali metal-sulfur-silicate condensation product.

About 5 parts by weight of the alkali metal-sulfur-silicate condensation product and 10 parts by weight of the broken down sodium lignin-cellulose silicate as produced in Example 2 are added to water to produce an aqueous solution containing 50% solids then bis(2-chloroethyl) ether, in an amount wherein the chloride atoms are about equal to the sodium atoms, is slowly added while agitating and keeping the temperature just below the boiling temperature of the reactants for about 30 minutes, the reaction is complete in 30 minutes to 8 hours, thereby producing a light brown in color somewhat elastic poly (organic polysulfide silicate broken down lignin-cellulose silicate) copolymer.

Any of the other previously described disubstituted organic compounds may be used in place of the bis(2-chloroethyl) ether in this example, such as ethylene dichloride, ethylene dibromide, propylene dichloride or dibromide, dihalides of unsaturated hydrocarbon gases derived from pressure-cracking processes; natural gas-cracking processes, polyhalide alkanes such as 1,1,2-trichloroethane; 1,2,4-trichlorobutane; trichloromesitylene; compounds containing disubstituted halogens, acid sulfates, nitrates, acid phosphates, bicarbonates, formates, acetates, propionates, laurate, oleate, stearate, oxalate, acid malonate, acid tartrate, acid citrate and mixtures thereof such as: A A'disubstituted ethyl ether, B B' disubstituted ethyl ether, disubstituted methyl ether, disubstituted ethoxy ethyl ether, disubstituted thio ethyl, disubstituted 1,3-methoxy 2,2-di-methyl propane, disubstituted dipropyl formal, disubstituted para-diethoxy benzene, disubstituted dimethoxy ethane, disubstituted diethyl carbonate, disubstituted glycol diacetate, p p' disubstituted dibenzyl ether, p p' disubstituted diphenyl ether, disubstituted diethyl sulphone, A A' disubstituted propyl ether, para-disubstituted benzene, disubstituted para-xylene, p, p'-disubstituted dibenzyl, disubstituted para hexyl propyl benzene, disubstituted 3-toyl propene-2, and mixtures thereof.

EXAMPLE 11

About 10 parts by weight of the broken down sodium lignin-cellulose silicate polymer as produced in 2b and 10 parts by weight of polyethylene glycol (mol. wt. 300 to 420) are mixed and heated until the polymer goes into solution then ethylene chloride is slowly added in an amount wherein the chlorine atoms about equal the sodium atoms while agitating at a temperature just below the boiling point of ethylene chloride for about 30 minutes thereby producing a broken down ethylene lignin-cellulose silicate copolymer.

About 10 parts by weight of TDI is added to the ethylene lignin-cellulose silicate copolymer in the polyethylene glycol and thoroughly mixed at ambient temperature. The mixture begins to expand in a few seconds and expands 8 to 12 times its original volume to produce a rigid polyurethane silicate foam which is light brown in color, tough and somewhat flexible.

Other polyols and polyisocyanate may be used in this example in place of polyethylene glycol and TDI. The polyurethane foam may be produced in large slabs then cut into sheets of the desired thickness and use as sound and thermal insulation in homes, buildings, aircraft and automobiles.

EXAMPLE 12

Diethyl oxalate is slowly added in an amount when in 1 mol of the diethyl oxalate is added per 2 mols of the sodium hydroxide present in the broken down sodium lignin-cellulose silicate polymer produced in 2b while agitating at a temperature just below the boiling point of the diethyl oxalate for about 30 minutes thereby produce brown granules a broken down organic lignin-cellulose silicate copolymer.

The polymer is then washed with water filtered to remove the salt, then dried. The dried polymer is then heated to 160° to 200° C. then forced into a mold under pressure to produce a useful object such as knobs, handles, art objects, etc., which are brown in color and are rigid and tough.

EXAMPLE 13

About 10 parts of the broken down organic lignin-cellulose silicate copolymer as produced in Example 12 is mixed with 10 parts by weight of polyethylene glycol (mol. wt. 380–420) is mixed and the copolymer goes into solution then 15 parts by weight of TDI are added and thoroughly mixed. About 1 part by weight of triethylamine is added and thoroughly mixed. The mixture begins to expand in a few seconds. The mixture expands 8 to 12 times its original volume thereby producing a rigid, cream colored polyurethane foam.

EXAMPLE 14

About 10 parts by weight of broken down alkali metal lignin-cellulose silicate polymer as produced in Example 1 and 5 parts by weight of an aqueous solution containing 37% by weight of formaldehyde are mixed then heated to below the boiling point of the reactants while agitating for 10 to 120 minutes thereby producing an aldehyde-broken down alkali metal lignin-cellulose silicate polymer; then 1 propane-1, 3-dihydrogen sulfate is added to the aqueous solution of aldehyde-broken down alkali metal lignin-cellulose silicate polymer in an amount wherein the hydrogen sulfate radicals are about equal to the alkali metal radicals, while agitating at ambient temperature and pressure for about 30 minutes. The reaction is complete in 30 minutes to 8 hours thereby producing an aldehyde broken down lignin-cellulose silicate propionate copolymer.

Other aldehydes may be used in place of formaldehyde such as acetaldehyde, propionic aldehyde, furfural, crotonaldehyde, acrolein, genzaldehyde, butyl aldehyde, pentanals, hexanals, heptanals, octanols and mixtures thereof.

Other substituted organic compound listed in the specification may be used in place of propane dihydrogen sulfate.

EXAMPLE 15

The dried powdered broken down organic lignin-cellulose silicate copolymer as produced in Example 12 is mixed with about equal parts by weight of "MDI" and 1% by weight of trimethylamine. The mixture expands in a few seconds to produce a rigid polyurethane foam.

EXAMPLE 16

About 2 parts by weight of the broken down lignin-cellulose silicate copolymer as produced in Example 1 and 2 parts by weight of an isocyanate-terminated polyurethane prepolymer listed below and 0.2 parts by weight of water containing 1% by weight of triethyleneamine and 30% by weight of sodium silicate are mixed and in a few minutes a solid polyurethane silicate resinous product is produced. This resinous product may be used as a cavity filler.

| Example | isocyanate-terminated polyurethane prepolymer |
|---|---|
| a | polyphenyl-polymethane-isocyanate with polyethylene oxide |

| Example | isocyanate-terminated polyurethane prepolymer |
|---|---|
| | monohydric alcohol (mol. wt. 1100), initiated on trimethylol propane to produce a prepolymer with a NCO content of about 18%. |
| b | TDI with polyethylene (mol. wt. 1000) to produce a prepolymer with a NCO content of about 24%. |
| c | residue of tolylene diisocyanate distillation with about 20% by weight of NCO with polyethylene glycol (mol. wt. 1500) to produce a prepolymer with a NCO content of about 10%. |
| d | tolylene diisocyanate with castor oil to produce a prepolymer with a NCO content of about 15%. |
| e | tolylene diisocyanate with a liquid hydroxyl-terminated polybutadiene (mol. wt. 500) to produce a prepolymer with a NCO content of about 7%. |
| f | toluene diisocyanate with a hydroxyl-group-containing polysulfide polymer to produce a prepolymer with a NCO content of about 12%. |
| g | methylene bis-phenyl diisocyanate with a liquid polyepichlorohydrin to produce a prepolymer of about 16%. |
| h | tolylene diisocyanate with a polyester (4 mols. of glycerol, 2.5 mols of adipic acid and 0.5 mol of phthalic anhydride) to produce a prepolymer with a NCO content of about 20%. |

EXAMPLE 17

About 10 parts by weight of the aldehyde broken down lignin-cellulose silicate propionate copolymer, 10 parts by weight of a sucrose amine polymer (POLY G 71-356 produced by Olin Chemical), 15 parts by weight of MDI and 10 parts by weight of sodium metal silicate pentahydrate are mixed at 30°–40° C. The mixture begins to expand in 15–45 seconds and expands 8 to 12 times its original volume to produce a rigid tough polyurethane silicate foam. The foam is flame resistant and may be used in construction of doors, panels and used as thermal and sound insulation. It may be cut into the desired width and thickness. Other alkali metal silicates may be used in place of sodium silicate.

EXAMPLE 18

About 10 parts by weight of the dried broken down lignin-cellulose silicate copolymer as produced in Example 1, 10 parts by weight of polypropylene glycol (mol. wt. 1200) 0.5 parts by weight of "DABCO R-8020" (triethylenediamine and dimethylethanolamine), produced by Air Products, 15 parts by weight of MDI ("PAPA 27" produced by Upjohn), 30 parts by weight of Portland Cement and 30 parts by weight of plaster's sand are mixed thoroughly. The mixture is then poured into 4"×6"×16" concrete block molds in the amount of ½"–¾" in depth. In a few seconds to 1 minute the mixture begins to expand and fills the molds. The mixture hardens within 5 minutes and is taken from the mold and placed in water for about 2 minutes. The excess cement is cured with the water thereby producing polyurethane silicate concrete blocks. These blocks may be used for building walls which have excellent insulation and flame resistant properties.

Although specific materials and conditions were set forth in the above examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for the production of polyurethane silicate product by the following steps:
 (a) mixing and reacting a broken down alkali metal lignin-cellulose silicate polymer and a substituted organic compound having at least two carbon atoms, each of which is attached to a substituent which will split off during the reaction, to said broken down alkali metal lignin-cellulose silicate polymer in the amount wherein the mols of the substituent radicals are about equal to the mols of the alkali radicals in the mixture thereby producing a broken down lignin-cellulose silicate copolymer;
 (b) mixing and reacting 1 to 95 parts by weight of the broken down lignin-cellulose silicate copolymer and 50 parts by weight of a polyisocyanate or a polyisothiocyanate thereby producing a polyurethane silicate product.

2. The process of claim 1 wherein the polyisocyanate is selected from the group consisting of aliphatic, cycloaliphatic, araliphatic, aromatic and heterocyclic polyisocyanates and mixtures thereof.

3. The process of claim 1 wherein the polyisocyanate is a phosgenation product of aniline-formaldehyde condensation.

4. The product produced by the process of claim 1.

5. The process of claim 1 wherein 1 to 95% parts by weight of a polyol is added in step (b) of claim 1 with the broken-down lignin-cellulose silicate polymer.

6. The product produced by the process of claim 5.

7. The process of claim 1 wherein up to 50% by weight of a curing agent and up to 10% by weight of an activator, percentage based on the weight of the reactants, are added with the broken down lignin-cellulose silicate copolymer in step (b) of claim 1.

8. The process of claim 1 wherein up to 200 parts by weight of a water-binding agent are added to the broken down lignin-cellulose silicate copolymer or polyisocyanate in step (b) of claim 1.

9. The product produced by the process of claim 8.

10. The process of claim 5 wherein the polyol is selected from the group consisting of polyether glycols, polyhydric alcohols, castor oil, and polyesters, polyamides, polyacetals and polycarbonates which contain 2 or more hydroxyl groups per molecule and mixtures thereof.

11. The process of claim 8 wherein the water-binding agent is selected from the group consisting of hydraulic cement, synthetic anhydride, gypsum and burnt lime.

12. The process of claim 1 wherein the polyisocyanate is first reacted with a polyol to produce an isocyanate-terminated polyurethane prepolymer then added in step (b) of claim 1.

* * * * *